J. C. WAKEFIELD.
Eye-Glasses and Spectacles.

No. 156,468.                          Patented Nov. 3, 1874.

Witnesses.
George L. Gill
John O. Holden

Inventor.
James C. Wakefield

UNITED STATES PATENT OFFICE.

JAMES C. WAKEFIELD, OF QUINCY, MASSACHUSETTS.

IMPROVEMENT IN EYE-GLASSES AND SPECTACLES.

Specification forming part of Letters Patent No. 156,468, dated November 3, 1874; application filed July 11, 1874.

*To all whom it may concern:*

Be it known that I, J. C. WAKEFIELD, of Quincy, in the county of Norfolk and Commonwealth of Massachusetts, have invented a new and useful Improvement in Eye-Glasses or Spectacles; and I hereby declare the following to be a full, clear, and exact description thereof, reference being made to the accompanying drawing making a part of this specification.

It is well known that considerable inconvenience is experienced by those who are obliged to wear eye-glasses or spectacles, from the fact that with the former there is almost always an uncomfortable pressure of the edges, the frame upon the sides of the nose, caused by the spring which retains the glasses upon the face, and also that the glasses are liable, from the manner in which they are secured, to become slightly displaced, so that the focus of the lens of the glass does not correspond with the focus of the lens of the eye, thus impairing considerably the efficiency of the glass, while with the latter, their size, the length of the bows or arms, the difficulty of adjusting them, and their liability to become broken, have rendered their use at the present time quite exceptional.

The nature of my invention consists in so constructing eye-glasses or spectacles that they will combine the advantages of both eye-glasses and spectacles as they are now ordinarily made, and in so arranging the parts that they can be more quickly, comfortably, and securely adjusted to the face than spectacles, and also can be folded so as to occupy no more space than does an ordinary pair of eye-glasses.

My improved eye-glasses or spectacles are constructed as follows: Ordinary spectacle-lenses are secured in metallic or other suitable frames, attached to which, by the joints such as are ordinarily used, are short arms or bows, (which usually do not exceed in length the longest diameter of the lenses,) having upon their outer extremities small flat pads of any suitable material, the inner surface of which, if metal, is slightly corrugated or roughened. Two lenses, mounted as above described, are attached together by a spring nose-piece, bent in a semicircular or semi-elliptical form, placed at right angles, or nearly at right angles, with the surface of the lenses, and in the same plane with that of the bows or arms above described, when extended or opened. This spring or nose-piece is fastened to the frames of the glasses by small projecting lips.

Figure 1:
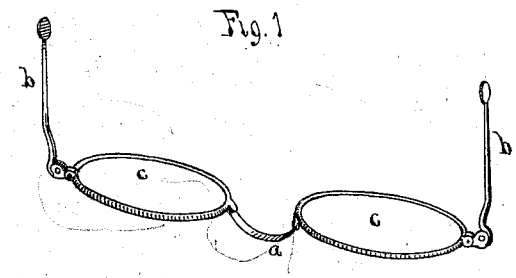
Figure 2:
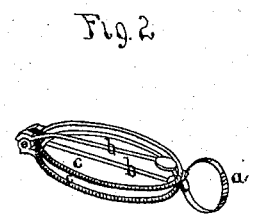

In the accompanying drawing, making a part of this specification, Figure 1 shows a view of my improved eye-glasses when open. Fig. 2 shows a view of the same when shut, in which *a* represents the spring nose-piece; *b b*, the arms or bows; *c c*, the lenses.

When worn and open these glasses are held in position by the pressure upon the temples of the face of the pads on the ends of the bows, which pressure is caused by the tension of the semicircular spring or nose-piece connecting the two lenses, and by the construction of the joints above referred to, which permits the bows to be bent back but little if any farther than at right angles to the plane of the lenses, and also by the spring which rests upon the bridge of the nose, its semicircular form and arrangement at right angles with the plane of the lenses fitting to the bridge of the nose, and permitting the lenses to be brought quite near to and directly in front of the eyes.

When not in use the glasses are folded together, one upon the other, the connecting spring or nose-piece serving as a hinge, and are held in position by the bows, which are folded or bent down upon the outside of the lenses. When thus arranged the glasses occupy no more space than an ordinary pair of eye-glasses, and can be carried in the same manner, and with as little danger of breaking.

What I claim as my invention, and desire to secure by Letters Patent, is—

In spectacles or eye-glasses, the combination of the spring nose-piece *a*, at right angles, or nearly so, to and with the frame and lens *c'c*, and hinged padded bows *b b*, capable of being folded up and held folded, and opened out, substantially as and for the purpose described.

JAMES C. WAKEFIELD.

Witnesses:
GEORGE L. GILL,
JOHN O. HOLDEN.